(12) United States Patent
Han et al.

(10) Patent No.: US 11,321,503 B2
(45) Date of Patent: May 3, 2022

(54) METHOD FOR PREDICTING STRUCTURAL FAILURE BY STRENGTH-CRITERION-DRIVEN PERIDYNAMIC MODEL

(71) Applicant: DALIAN UNIVERSITY OF TECHNOLOGY, Dalian (CN)

(72) Inventors: Fei Han, Dalian (CN); Yongwei Wang, Dalian (CN); Gilles Lubineau, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 0 days.

(21) Appl. No.: 17/431,433

(22) PCT Filed: Dec. 1, 2020

(86) PCT No.: PCT/CN2020/133025
§ 371 (c)(1),
(2) Date: Nov. 2, 2021

(87) PCT Pub. No.: WO2021/248850
PCT Pub. Date: Dec. 16, 2021

(65) Prior Publication Data
US 2022/0075911 A1    Mar. 10, 2022

(30) Foreign Application Priority Data
Jun. 11, 2020 (CN) .................... CN202010528378.4

(51) Int. Cl.
*G06F 30/20* (2020.01)
*G06F 119/14* (2020.01)
*G06F 30/17* (2020.01)

(52) U.S. Cl.
CPC .............. *G06F 30/17* (2020.01); *G06F 30/20* (2020.01); *G06F 2119/14* (2020.01)

(58) Field of Classification Search
CPC ....... G06F 30/17; G06F 30/20; G06F 2119/14
See application file for complete search history.

(56) References Cited

FOREIGN PATENT DOCUMENTS

| CN | 109376417 A | 2/2019 |
|---|---|---|
| CN | 109657365 A | 4/2019 |

(Continued)

OTHER PUBLICATIONS

Yicong Zhou, et al., Peridynamic model of unilateral coated envelope material for aerostatics, Acta Materiae Compositae Sinica, 2018, vol. 35 No. 10.

(Continued)

*Primary Examiner* — Rehana Perveen
*Assistant Examiner* — Alfred H B Wechselberger
(74) *Attorney, Agent, or Firm* — Bayramoglu Law Offices LLC

(57) ABSTRACT

A method for predicting a structural failure by a strength-criterion-driven peridynamic model is provided. By building a peridynamic model driven by the strength-criterion of structural materials and then applying geometric and material parameters and working conditions of a structure, a life period from a deformation to a complete break of the structure is predicted. The method is of a high reliability, a wide application range, and a high calculation efficiency. The method simulates an initiation and a propagation of multiple cracks on complex structures under complex load conditions until the structure is destroyed.

5 Claims, 4 Drawing Sheets

(56) References Cited

FOREIGN PATENT DOCUMENTS

| CN | 111062117 A | 4/2020 |
| CN | 111104751 A | 5/2020 |
| CN | 111814310 A | 10/2020 |

OTHER PUBLICATIONS

Michiya Imachi, et al., A computational approach based on ordinary state-based peridynamics with new transition bond for dynamic fracture analysis, Engineering Fracture Mechanics, 2019, pp. 359-374, 206.

METHOD FOR PREDICTING STRUCTURAL FAILURE BY STRENGTH-CRITERION-DRIVEN PERIDYNAMIC MODEL

CROSS REFERENCE TO THE RELATED APPLICATIONS

This application is the national stage entry of International Application No. PCT/CN2020/133025, filed on Dec. 1, 2020, which is based upon and claims priority to Chinese Patent Application No. 202010528378.4 filed on Jun. 11, 2020, the entire contents of which are incorporated herein by reference.

TECHNICAL FIELD

This invention belongs to the technical field of structural analysis and fracture prediction and relates to the method for predicting structural failure by the strength-criterion-driven peridynamic model.

BACKGROUND

The process from deformation, damage, then to instability or destruction of the structure under external loads is a challenging problem that solid mechanics have struggled for since the Galileo era and has not been overcome. The main challenges in this field are the interdisciplinarity, multi-level nature, and the unclear state equations for the failure process. The linear elastic fracture mechanics that emerged in the 1920s and the continuum damage mechanics that appeared in the 1950s are useful explorations of the material destruction process by solid mechanics. They have gained a lot. However, the traditional linear elastic fracture mechanics does not consider the microscopic mechanism of cracks' initiation, but just reduces all details that change near the crack's tip to parameters, such as the stress intensity factor. It establishes the dynamic relationship of the crack propagation model according to these parameters.

Meanwhile, the cracks must be regarded as the boundary of the object. The traditional damage mechanics is based on continuum mechanics, assuming a continuously distributed mass density field. The zone containing many dispersed microcracks is regarded as a local uniform field. The traditional damage mechanics describes the uniform field's damaged state by defining a field variable with objective statistical characteristics, namely the damage variable. As the damage mechanics is based on the assumption of a continuous field, it is impossible to face the fact that "crack is a kind of discontinuity", nor can it simulate the actual crack propagation process.

For the failure of structure and its material, the emerging international peridynamics has developed a different way and has established a new theoretical system of mechanics based on the non-local interaction. In this theory, two non-contact material points within a finite distance interacting through a bond between them. Mechanics describe the initiation and propagation process of cracks by defining a unified bond-breaking criterion in advance. The modeling method of peridynamics unifies continuous and discontinuous and can simulate the spontaneous crack initiation and propagation. However, when describing the elastic deformation, stress concentration, and damage evolution at the macro-scale, the non-local interaction introduced by peridynamics lacks experimental support, and its physical significance is also unclear. On the other hand, the non-local interaction feature of peridynamic results in the calculation of it being several orders of magnitude higher than that of the finite element method based on the theory of classical continuum mechanics under the premise of the same degree of freedom. Therefore, it costs many computing resources to use the peridynamics in the whole structure and may even fail to achieve the expected goal because the actual calculation needs are too large.

In responding to the above problems, a known type of technology, which is often called "Morphing coupling method of local/non-local continuum mechanics model", couples the classical continuum mechanics (damage mechanics) with the peridynamics. This technology is implemented by introducing a weighting function into the peridynamic micro-modulus coefficients and using the deformation energy density equivalence at each point in the structure to derive the constraint conditions of constitutive parameters. Finally, it establishes a set of mathematical equations of initial boundary value problems of mechanics. Based on these equations, the solving method can use elastic or damage models to simulate the deformation and damage of the structure. Then, it introduces the peridynamic model at the proper time to simulate the initiation and propagation of cracks, finally to achieve a simulation of the structural life period from deformation, damage to failure. Currently, such basic strategies include two known technical approaches:

(1) A Coupling Method with Pre-Set Sources of Peridynamic Domain

According to the solution method above, before the calculation starts, the initial value of the weighting function needs to be preset on the entire structure. The initial value is set to determine the model's constitutive parameters on each domain, thus defining the source of the peridynamic domain. This domain will become the birthplace of the peridynamic domain updated continuously as the cracks propagate in the subsequent calculation process. The peridynamic domain is updated continually to simulate the initiation and propagation of cracks.

As the name implies, "A coupling method of the pre-set sources of peridynamic domain" requires pre-setting the source of the peridynamic domain as a birthplace from which the peridynamic model extends, to simulate the crack initiation and propagation on the structure. It requires technicians to have a rich experience when using this method and accurately predict where cracks will initiate in the structure. However, if the structure and external load conditions are complicated, it is challenging to predict all cracks' initiation (the structure's failure usually has more than one crack). The dependence of this known technology on human experience makes it unable to meet complex application requirements. It is a shortcoming of this technology.

(2) A Coupling Method Through Adaptively Introducing Peridynamics Based on Damage Variables Under the influence of external load and environment, the degradation process of materials or structure induced by the microstructure's defects (such as microcracks, micro holes, etc.) is called damage. Classical damage mechanics uses the phenomenological method of continuum mechanics to study the damage process. It focuses on the impact of material damage on the structure's macro-mechanical properties and focuses on the process and law of damage evolution. In the study of damage mechanics, it is necessary to choose an appropriate state variable to characterize the damage, namely the damage variable (denoted as d in this work); besides, the damage evolution equation and the constitutive with the damage variable must be determined.

Based on the basic strategies mentioned above, this method couples the classical damage mechanics model with the peridynamic model to establish a set of mathematical equations for the initial boundary value problem of mechanics with damage variable. Based on these equations, the solution method uses a pure damage mechanics model to simulate the evolution process involving the structure's deformation and damage. Suppose the damage variable of a specific local position on the structure reaches the critical damage condition. In that case, this method will determine the corresponding model's constitutive parameters in the zone near the local place by adjusting the value of the weighting function, to achieve the purpose of applying the peridynamic model to replace the original damage mechanics model for subsequent calculations in this local zone. With the continuous evolution of the damage state on the structure, the zone on which the damage variable reaches the critical damage condition will become bigger and bigger; thus, the peridynamic domain will be updated and expanded continuously. In the updated peridynamic domain, cracks will initiate and propagate. As the cracks propagate, the damage state in the front edge of the crack tips will continue to evolve. The damage variable will quickly reach the critical damage condition, which will cause the peridynamic domain to be updated and expanded to simulate crack propagation until the entire structure is destroyed.

Although the "coupling method through adaptively introducing peridynamics based on damage variables" can use peridynamic models to simulate the crack propagation process, it must couple the classical damage mechanics models and use the damage variable as an adaptive indicator. As mentioned above, damage describes the degradation of materials or structures due to defects of the microstructure. Specifically speaking, in the classical damage mechanics model, this degradation process is reflected in the degradation of the stiffness of the material, that is, the stiffness tensor of the material should be multiplied by a coefficient $(1-d)$ (where d is the damage variable, and it usually ranges in $[0,1]$). Furthermore, in the "coupling method through adaptively introducing peridynamics based on damage variables", only when the damage variable d reaches the critical damage condition (that is, $d=d_{crit}$) can peridynamic model be introduced, where $d_{crit}$ is the critical damage value, and $d_{crit}$ must be greater than 0. In other words, the material's stiffness has degraded at the moment of introducing the peridynamic model.

However, it is worth pointing out that not all structures have noticeable material degradation processes during the failure process, nor the effects of material degradation must be considered. In comparison, for some fiber-reinforced resin-matrix composite materials, the material degradation during the failure process is noticeable and must be considered. However, for some brittle rocks, glass, ceramics, and other materials, the failure mode is often brittle fracture; that is, there is no evident material degradation phenomenon in the fracture process. Damage mechanics, which considers material degradation, is only one way to study structural failure. On the other hand, the structural damage analysis based on strength theory and fracture mechanics is still an effective way for engineering applications. These technologies do not introduce damage variables to consider the material degradation caused by the microstructure's defects. Therefore, for some structures, the fracture simulation cannot and does not have to use a damage variable to introduce the peridynamics.

SUMMARY

This invention aims to solve the deficiencies of the current technology and provide a method for predicting structural failure by the strength-criterion-driven peridynamic model. Specifically, it provides a way to automatically introduce the peridynamic model to simulate structural failure based on the strength criterion. This method is of high reliability, wide application range, and high calculation efficiency. It can simulate the cracks' initiation and propagation under complex load conditions until the structure is destroyed.

This invention is based on the coupling continuum-mechanics/peridynamics model that has been constructed. Before calculating the structure, the weighting function's value on the entire structure is set to zero. The value of the weighting function affects the value of the stiffness tensor in the continuum mechanics model and the value of the micro-modulus in the peridynamic model through the constraint equations in the coupling model, so that the coupling model used in the calculation can be degenerated into a pure continuum mechanics model (the micro-modulus functions of the peridynamics in the coupling model will all be zero); then, the strain field and stress field on the entire structure are obtained through calculation, and then use the appropriate strength criterion (for example, the maximum tensile stress strength criterion or the maximum tensile strain strength criterion, etc.) to determine the strength failure of the entire structure; with the gradually increase of the external load condition during the calculation process, if the stress state of a specific position on the structure reaches the strength of the material according to the strength criterion, then adjust the value of the weighting function near the place (with this point as the center, set the value of the weighting function in the local small neighborhood as 1, and the weighting function outside the neighborhood gradually attenuates from 1 to 0). The weighting function's value again affects the value of micro-modulus in the peridynamic model through the constraint equations of the coupling model. As a result, the effect of the peridynamic model in the zone near the point appears and replaces the continuum mechanics model's effect. If there is no new point in the structure whose stress state reaches the material strength, the continuum mechanics model and peridynamic model in the coupling model will remain unchanged on the entire structure. When the peridynamic model is introduced into the structure, it will be used to simulate the crack initiation and propagation process in some parts of the structure. The continuum mechanics model will be used for the strain field and stress field calculation in other domains of the structure. It is worth pointing out that a coexistence transition exists between the continuum mechanics and peridynamic domains; the domain where the peridynamic model has been active cannot be restored to the continuum mechanics domain.

The present invention is also based on the basic coupling strategy mentioned above, but instead of coupling the damage mechanics model, it couples the classical continuum mechanics model with the peridynamic model to establish a set of mathematical equations for the initial and boundary value problems of mechanics. Moreover, this invention does not need to pre-set the source of the peridynamic domain. It uses the pure continuum mechanics model to solve the complex strain field and stress field on the structure first. According to the calculation results of the stress field or strain field on the structure and the strength theory in mechanics, the appropriate strength criterion is applied to determine whether the complex stress state at different positions on the structure reaches the critical stress value, that is, the strength of the material. When the stress state at a specific place of the structure reaches the material strength, this method will determine the corresponding model's constitutive parameters near that place by adjusting the value of the weighting function. As a result, it realizes using the peridynamic model to replace the original continuum mechanics model for subsequent calculations near that place. Accordingly, as the stress state on the structure continues to evolve, there will be more zones where the stress states reach the material strength. Then, the domain of the peridynamic model will continue to be updated and expanded. In the updated peridynamic domain, cracks will initiate and propagate. With the propagation of the cracks, the stress state on the structure will continue to evolve. There will be more positions whose stress states reach the material strength, resulting in the continuous update and expansion of the peridynamic domain to simulate crack propagation until the entire structure is destroyed.

The present invention is based on the classical strength theory. It analyzes the structure's complex stress state by applying appropriate strength criteria to find the position where cracks may appear. It then introduces a peridynamic model to simulate the cracks' initiation and propagation process, which overcomes the shortcomings of "A coupling method with pre-setting sources of peridynamic domain".

Specifically, the method for predicting structural failure by strength-criterion-driven peridynamic model of this invention can obtain the life period from deformation to complete failure of the predicted structure by establishing the strength-criterion-driven peridynamic model and inputting the geometric and material parameters and working conditions of the predicted structure in the model; The specific process of the method for predicting structural failure by strength-criterion-driven peridynamic model is:

(1) Build the strength-criterion-driven peridynamic model for a structure;

The strength criterion of the structural materials is summarized as:

$$\theta(\sigma(x)) \geq \theta_{crit} \text{ and } x \in \Omega,$$

where $\Omega$ denotes the set of all points in the structure, $\theta(\sigma(x))$ denotes the strength function of the stress tensor $\sigma(x)$ at point x of the stress field, $\theta_{crit}$ is the strength of the structural material.

Define $\Omega_\theta$ as the set of all points that meet the strength criterion for the first time during the entire calculation process;

According to the strength criterion of the structural material, the coupling equations of continuum mechanics and peridynamics, and the bond-breaking criterion of peridynamic bond $\xi$:

A) At the initial calculation step t=0, set the weighting function $\alpha(x)=0$ and the switching function $\mu(t,\xi)=1$ in the coupling equations; and set the initial and maximum external load;

B) Solve the coupling equations to obtain the displacement field, strain field, and stress field of the structure;

C) Calculate the stretch s and $\mu(t,\xi)$ of the peridynamic bond $\xi$ according to the bond-breaking criterion and the displacement field;

If the considered bond satisfies $\mu(t,\xi)=0$ for the first time, then to record the number $l_\xi$ of such bonds;

If not, then $l_\xi=0$;

D) The determination of the strength criterion and the definition of the morphing function:

According to the strength criterion of the structural material, determine whether there are m points $p_i$ (where i=1, 2, 3, ..., m) in $\Omega$ that meet the strength criterion for the first time;

If not, then m=0 and go to step F);

If there are m points $p_i$, then define the morphing function $\alpha_{p_i}(x)$, $\forall x \in \Omega$ for each point respectively:

$$\alpha_{p_i}(x) = \begin{cases} 1, & \|x - p_i\| \leq r_{p_i}^0 \\ \Gamma_{p_i}(x), & r_{p_i}^0 < \|x - p_i\| \leq r_{p_i}^1 \\ 0, & \|x - p_i\| > r_{p_i}^1 \end{cases}$$

where $\Gamma_{p_i}(x)$ is a function whose value range is [0,1], $r_p^0$ and $r_p^1$ are two non-negative numbers, and $r_p^0 \leq r_p^1$;

E) Update $\alpha(x)$, $\forall x \in \Omega$;

Put m points $p_i$ into $\Omega_\theta$. If $\Omega_\theta$ contains n points $p_i$ (where i=1, 2, 3, ..., n, and n≥m), then the value of $\alpha(x)$ is the maximum value of n functions, $\alpha_{p_i}(x)$, i.e.:

$$\alpha(x) = \max\{\alpha_{p_i}(x) | \forall p_i \in \Omega_\theta, i=1,2,\ldots,n\}, \forall x \forall n$$

F) Loop B)-E) until $l_\xi=0$ and m=0;

G) Increase the external load successively and loop B)-F) after each increase of the external load value, until the external load exceeds the maximum external load;

H) End the calculation and output the results by the strength-criterion-driven peridynamic model, i.e., the structure's damage prediction.

(2) Input the geometric and material parameters and working conditions of the predicted structure into the strength-criterion-driven peridynamic model, then the failure life period of the predicted structure can be obtained.

As a preferred technical solution:

As the method for predicting structural failure by strength criterion-driven peridynamic model described above, the calculation results include strain field contour, stress field contour, and bond-breaking equivalent damage contour, animation from crack initiation and propagation on the structure until complete failure of the structure, the stress-displacement curve of the entire life period. In the bond-breaking equivalent damage contour, the calculation formula for the bond-breaking equivalent damage $d_\xi(x,t)$ at point x at calculation step t is:

$$d_\xi(x,t) = \frac{\int_{H_\delta(x)} (1-\mu(t,\xi))\omega_{crit} dV_p}{\int_{H_\delta(x)} \omega_{crit} dV_p},$$

where $\omega_{crit}$ denotes the critical fracture energy of peridynamic bond, and its calculation formula is:

$$\omega_{crit} = \frac{1}{2} c^0(\xi) s_{crit}^2 \|\xi\|^4.$$

As the method for predicting structural failure based on the strength-criterion-driven peridynamic model described above, establish the following coupling equations of continuum mechanics and peridynamics according to the geometric dimensions, material parameters, and external load conditions of the structure:

Kinematic Admissibility and Compatibility:

$$\varepsilon(x) = \frac{1}{2}(\nabla u(x) + \nabla u(x)^T),$$

$\forall \in \Omega, 22$ $\eta(p,x) = u(p) - u(x), \forall x, p \in \Omega,$ $u(x) = \bar{u}(x), \forall x \in \Gamma_u,$ Static Admissibility:

$$div\sigma(x) + \int_{H_\delta(x)} \{\hat{f}[x]\langle p-x \rangle - \hat{f}[p]\langle x-p \rangle\} dV_p + b(x) = 0,$$

$\forall x \in \Omega,$ $\sigma(x) \cdot n(x) = \bar{T}, \forall x \in \Gamma_T,$ Constitutive Equations:

$\sigma(x) = E(x):\varepsilon(x), \forall x \in \Omega,$ $$\hat{f}[x]\langle p-x \rangle = \frac{1}{2} C[x](\xi) \cdot \eta(p,x),$$

$\forall x, p \in \Omega,$

Constraint Equations:

$C[x](\xi) = \alpha(x) c^0(\xi) \mu(t,\xi) \xi \otimes \xi,$ $$E(x) = E^0 - \frac{1}{2}\int_{H_\delta(x)} c^0(\xi) \frac{\alpha(x) + \alpha(p)}{2} \xi \otimes \xi \otimes \xi \otimes \xi dV_p,$$

$$E^0 = \frac{1}{2}\int_{H_\delta(x)} c^0(\xi) \xi \otimes \xi \otimes \xi \otimes \xi dV_p,$$

where x and p denote the point in set $\Omega$ of all points in the structure, u(•) is the displacement field, $\nabla u(x)$ denotes the gradient of u(x), $\nabla u(x)^T$ denotes the transpose of the gradient of u(x), $\varepsilon(x)$ is the strain tensor of the strain field at point x, $\eta(p,x)$ denotes the difference between the displacements of two points, and u(x) is the value of the displacement condition $\bar{u}$ applied at point x on the boundary $\Gamma_u$, $\sigma(x)$ is the stress tensor of the stress field at point x, $div\sigma(x)$ is the divergence of the stress tensor at point x, $\hat{f}[\bullet]\langle \cdot - \cdot \rangle$ is the bond force density, $H_\delta(x)$ is a circular zone with a radius $\delta$ and centers on x, $\int_{H_\delta(x)} \cdot dV_p$ denotes the integral over $H_\delta(x)$, b(x) is the external body force vector of the external body force field at point x, and n(x) is the outer normal direction vector at point x, $\bar{T}$ is the force boundary condition applied on the boundary $\Gamma_T$, E(x) is the stiffness tensor at point x, f is the peridynamic bond and $\xi = p - x$, and $C[x](\xi)$ is the micro-modulus tensor at point x associated with the bond $\xi$, $c^0(\xi)$ is the micro-modulus coefficient of bond $\xi$, $\mu(t,\xi)$ is the function associated with calculation step t and bond $\xi$ and takes values on either 0 or 1, $E^0$ is the stiffness tensor, $\alpha(\bullet)$ is the weighting function of the point. The definition of the operator ":" denotes the double dot product operation of the tensor, "•" denotes the single dot product operation of the tensor and $\otimes$ denotes the vector's dyadic operation. It should be pointing out that the coupling equations of continuum mechanics and peridynamics are only applicable to static and quasi-static failure problems. However, the method for predicting structural failure by strength-criterion-driven peridynamic model described in this invention is also suitable for solving the dynamic coupled continuum-mechanics/peridynamics equation and predicting the dynamic failure of the structure.

As the method for predicting structural failure by strength-criterion-driven peridynamic model mentioned above, the bond-breaking criterion of peridynamics is defined as:

$$\mu(t,\xi) = \begin{cases} 1, \\ 0, \end{cases}$$

if $s(t',\xi) < s_{crit}$, for all $0 \le t' \le t$,
otherwise, $$s = \frac{\|\xi + \eta\| - \|\xi\|}{\|\xi\|} \xi,$$

where $\|\bullet\|$ is the length of the calculated vector, s is the stretch of bond $\xi$, $s_{crit}$ is the critical stretch of the bond, t denotes the current calculation step, t' is an arbitrary calculation step before calculation step t, and $s(t',\xi)$ is the stretch of bond $\xi$ at calculation step t', $\mu(t,\xi) = 0$ means that bond $\xi$ is broken.

As the method for predicting structural failure by strength-criterion-driven peridynamic model described above, the strength function $\theta(\sigma(x))$ is defined as $\theta(\sigma(x)) = \sigma_1$ according to the theory of maximum tensile stress;

or, define it as $\theta(\sigma(x)) = \sigma_1 - \upsilon(\sigma_2 + \sigma_3)$ according to the theory of maximum tensile strain, where $\upsilon$ is the Poisson's ratio;

or, define it as $\theta(\sigma(x)) = \sigma_1 - \sigma_3$ according to the theory of maximum shear stress; or, define it as $$\theta(\sigma(x)) = \sqrt{\frac{1}{2}[(\sigma_1 - \sigma_2)^2 + (\sigma_2 - \sigma_3)^2 + (\sigma_3 - \sigma_1)^2]}$$

according to the theory of maximum distortion energy.

where $\sigma_1$, $\sigma_2$ and $\sigma_3$ are:

At least 3 planes orthogonal to each other can be found at point x. In these planes, the shear stress components of stresses tensor $\sigma(x)$ are zero, and the normal stresses components reach the extremum. These planes are called principal planes, and the normal stresses on them are called principal stress, noted as $\sigma_1$, $\sigma_2$ and $\sigma_3$, and it is stipulated that $\sigma_1$ is the maximum principal stress and $\sigma_3$ is the minimum principal stress.

According to the content above, to predict the entire life period of structure from deformation to failure under load conditions, using the traditional method based on continuum mechanics theory alone cannot solve it. A peridynamic model must be introduced to predict the initiation and propagation of cracks. However, it is inefficient and unreliable to determine a complex structure's crack initiation zone under different load conditions by experience. It requires finding a clear indicator to replace human operation and automatic judgment during the calculation process. The damage variable based on the damage mechanics theory is such an indicator, but not all materials have material damage degradation before a fracture occurs. There is no material damage for most of the brittle fracture process, which requires finding new technical indicators. Therefore, the method proposed in this invention is based on the strength theory. Using material strength as an indicator to introduce the peridynamic model to predict structural failure is an effective solution. The reasons are as follows: Firstly, the strength theory is about the law of yield and failure of materials under complex stress states. Strength theory is an essential basis for the study of material strength and structural strength. It has been widely used in physics, mechanics, material science, geoscience, and engineering. Secondly, it is believed that when the complex stress reaches a specific limit state, the structure will begin to fail. The strength criterion is the particular characterization of these ultimate stress states. Besides, during the hundred years from the beginning of the last century to the present, people have done a lot of theoretical research and experimental verification on the strength theory and proposed hundreds of models or guidelines, which form a rich criterion library for technicians to study and use.

Finally, strength theory is still based on continuum mechanics. It can be used to predict the initiation of cracks on the structure, but it cannot predict the propagation direction after the crack appears, the cracking speed, and the life of the structure because the cracking process of the structure is a discontinuous deformation process which requires using new theories such as peridynamics that do not take the assumption of continuity as the premise for research. Above all, this invention creatively combines the strength theory and peridynamic theory. It uses the material strength as a clear determination indicator to introduce a peridynamic model to predict the cracks' initiation and propagation process on the structure. It conforms to the basic principles of physics and mechanics and takes into account brand-new technical approaches. It breaks through the dilemma that traditional methods cannot predict the entire life period of structure from deformation to failure. It has simple, practical characteristics and extensive application prospects.

The method for predicting structural failure by strength-criterion-driven peridynamic model can obtain calculation results. According to these calculation results, it is possible to understand relevant information, such as the load change trend, the peak load, the crack initiation position, the crack propagation path, fracture mode, and structure fracture degree of the structure during the life period. Based on this knowledge, designers can optimize the real structure's design, which helps to build more reliable and stable industrial equipment, buildings, and other structures.

Based on the coupling model of continuum mechanics and peridynamics, this invention proposes introducing peridynamics automatically for simulating structural failure through strength criterion determination. Compared with the classical continuum mechanics simulation, this invention can simulate the process of crack initiation and fracture. Compared with the simulation that uses a peridynamic model on the entire structure, the method proposed in this invention only uses a peridynamic model in the local zone near the crack. Most other zones on the structure still adopt more economic classical continuum mechanics simulation, which dramatically reduces the amount of calculation and saves calculation time. Compared with the known technology mentioned above, there is no need to pre-set the peridynamic domain by experience in this invention. The peridynamic model is introduced adaptively to make the prediction more accurate. Moreover, this invention does not consider the material's degradation process and is more suitable for predicting the typical structural failure process, such as a brittle fracture.

DETAILED DESCRIPTION OF THE EMBODIMENTS

Figure 1:
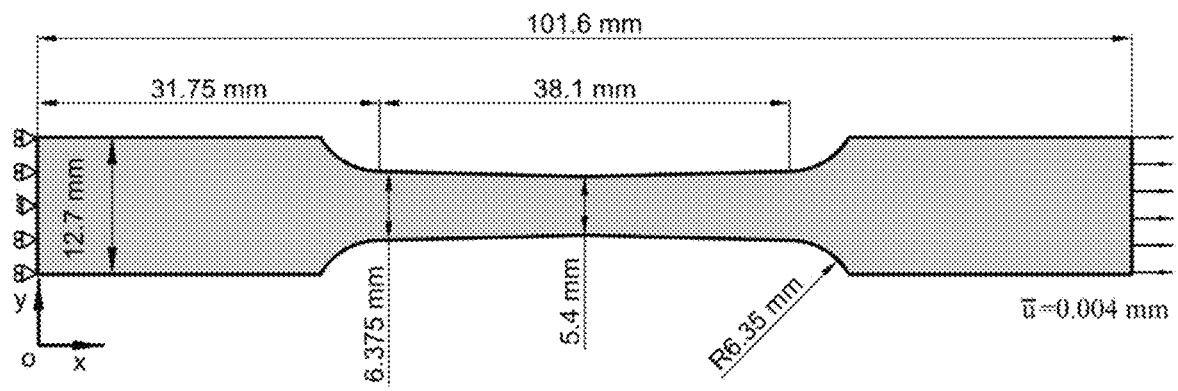
FIG. 1 shows the geometric dimensions and external load conditions of the dog-bone-shaped structure.

The present invention will be further explained below in conjunction with specific implementations. It should be understood that these examples are only used to illustrate this invention and not to limit the scope of this invention. Besides, it should be understood that after reading this invention, those skilled in this technical field can make various changes or modifications to this invention, and these equivalent forms also fall within the scope defined by the claim of this application.

The method for predicting structural failure by strength-criterion-driven peridynamic model of this invention builds the strength-criterion-driven peridynamic model of the structure. It applies the geometric and material parameters and its working conditions of the predicted structure in the model. The life period from deformation to complete break of the predicted structure can be obtained.

The specific process of the method for predicting structural failure by strength-criterion-driven peridynamic model is:

(1) Build the strength-criterion-driven peridynamic model for a structure;

The strength criterion of the structural materials is summarized as:

$$\theta(\sigma(x)) \geq \theta_{crit} \text{ and } x \in \Omega,$$

where $\Omega$ denotes the set of all points in the structure, $\theta(\sigma(x))$ denotes the strength function of the stress tensor $\sigma(x)$ at point x of the stress field, $\theta_{crit}$ is the strength of the structural material.

Define $\Omega_\theta$ as the set of all points that meet the strength criterion for the first time during the entire calculation process;

The strength function $\theta(\sigma(x))$ is defined as $\theta(\sigma(x))=\sigma_1$ according to the theory of maximum tensile stress;

or, define it as $\theta(\sigma(x))=\sigma_1-\upsilon(\sigma_2+\sigma_3)$ according to the theory of maximum tensile strain, where $\upsilon$ is the Poisson's ratio;

or, define it as $\theta(\sigma(x))=\sigma_1-\sigma_3$ according to the theory of maximum shear stress;

or, define it as $$\theta(\sigma(x)) = \sqrt{\frac{1}{2}[(\sigma_1-\sigma_2)^2 + (\sigma_2-\sigma_3)^2 + (\sigma_3-\sigma_1)^2]}$$

according to the theory of maximum distortion energy. where $\sigma_1$, $\sigma_2$ and $\sigma_3$ are:

At least 3 planes orthogonal to each other can be found at point x. In these planes, the shear stress components of stresses tensor $\sigma(x)$ are zero, and the normal stresses components reach the extremum. These planes are called principal planes, and the normal stresses on them are called principal stress, noted as $\sigma_1$, $\sigma_2$ and $\sigma_3$, and it is stipulated that $\sigma_1$ is the maximum principal stress and $\sigma_3$ is the minimum principal stress.

Establish the following coupling equations of continuum mechanics and peridynamics according to the geometric dimensions, material parameters, and external load conditions of the structure:

Kinematic Admissibility and Compatibility:

$$\varepsilon(x) = \frac{1}{2}(\nabla u(x) + \nabla u(x)^T),$$

$\forall x \in \Omega,$ $$\eta(p,x) = u(p) - u(x), \forall x,p \in \Omega,$$

$$u(x) = \bar{u}(x), \forall x \in \Gamma_u,$$

Static Admissibility:

$$div\sigma(x) + \int_{H_\delta(x)} \{\hat{f}[x]\langle p-x\rangle - \hat{f}[p]\langle x-p\rangle\}dv_p + b(x) = 0,$$

$\forall x \in \Omega,$ $$\sigma(x) \cdot n(x) = \bar{T}, \forall x \in \Gamma_T,$$

Constitutive Equations:

$$\sigma(x) = E(x):\varepsilon(x), \forall x \in \Omega,$$

$$\hat{f}[x]\langle p-x\rangle = \frac{1}{2}C[x]\langle \xi\rangle \cdot \eta(p,x),$$

$\forall x,p \in \Omega,$

Constraint Equations:

$$C[x]\langle \xi\rangle = \alpha(x)c^0(\xi)\mu(t,\xi)\xi\otimes\xi,$$

$$E(x) = E^0 - \frac{1}{2}\int_{H_\delta(x)} c^0(\xi)\frac{\alpha(x)+\alpha(p)}{2}\xi\otimes\xi\otimes\xi\otimes\xi dV_p,$$

$$E^0 = \frac{1}{2}\int_{H_\delta(x)} c^0(\xi)\xi\otimes\xi\otimes\xi\otimes\xi dV_p,$$

where x and p denote the point in set $\Omega$ of all points in the structure, u(•) is the displacement field, $\nabla u(x)$ denotes the gradient of u(x), $\nabla u(x)^T$ denotes the transpose of the gradient of u(x), $\varepsilon(x)$ is the strain tensor of the strain field at point x, $\eta(p,x)$ denotes the difference between the displacements of two points, and $\bar{u}(x)$ is the value of the displacement condition $\bar{u}$ applied at point x on the boundary $\Gamma_u$, $\sigma(x)$ is the stress tensor of the stress field at point x, $div\sigma(x)$ is the divergence of the stress tensor at point x, $\hat{f}[\bullet]\langle \cdot - \cdot\rangle$ is the bond force density, $H_\delta(x)$ is a circular zone with a radius $\delta$ and centers on x, $\int_{H_\delta(x)} \cdot dV_p$ denotes the integral over $H_\delta(x)$, b(x) is the external body force vector of the external body force field at point x, and n(x) is the outer normal direction vector at point x, $\bar{T}$ is the force boundary condition applied on the boundary $\Gamma_T$, E(x) is the stiffness tensor at point x, f is the peridynamic bond and $\xi=p-x$, and $C[x]\langle \xi\rangle$ is the micro-modulus tensor at point x associated with the bond $\xi$, $c^0(\xi)$ is the micro-modulus coefficient of bond $\xi$, $\mu(t,\xi)$ is the function associated with calculation step t and bond $\xi$ and takes values on either 0 or 1, $E^0$ is the stiffness tensor, $\alpha(\bullet)$ is the weighting function of the point. The definition of the operator ":" denotes the double dot product operation of the tensor, "·" denotes the single dot product operation of the tensor and $\otimes$ denotes the vector's dyadic operation.

The bond-breaking criterion of peridynamics is defined as:

$$\mu(t,\xi) = \begin{cases} 1, & \text{if } s(t',\xi) < s_{crit}, \text{ for all } 0 \leq t' \leq t, \\ 0, & \text{otherwise,} \end{cases}$$

if $s(t',\xi) < s_{crit}$, for all $0 \leq t' \leq t$, otherwise, $$s = \frac{\|\xi+\eta\| - \|\xi\|}{\|\xi\|}\xi,$$

where $\|\bullet\|$ is the length of the calculated vector, s is the stretch of bond $\xi$, $s_{crit}$ is the critical stretch of the bond, t denotes the current calculation step, t' is an arbitrary calculation step before calculation step t, and $s(t',\xi)$ is the stretch of bond $\xi$ at calculation step t', $\mu(t,\xi)=0$ means that bond $\xi$ is broken.

According to the strength criterion of the structural material, the coupling equations of continuum mechanics and peridynamics, and the bond-breaking criterion of peridynamic bond $\xi$:

A) At the initial calculation step t=0, set the weighting function $\sigma(x)$=0 and the switching function $\mu(t,\xi)$=1 in the coupling equations; and set the initial and maximum external load;

B) Solve the coupling equations to obtain the displacement field, strain field, and stress field of the structure;

C) Calculate the stretch s and $\mu(t,\xi)$ of the peridynamic bond $\xi$ according to the bond-breaking criterion and the displacement field;

If the considered bond satisfies $\mu(t,\xi)$=0 for the first time, then to record the number $l_\xi$ of such bonds;

If not, then $l_\xi$=0;

D) The determination of the strength criterion and the definition of the morphing function:

According to the strength criterion of the structural material, determine whether there are m points $p_i$ (where i=1, 2, 3, . . . , m) in $\Omega$ that meet the strength criterion for the first time;

If not, then m=0 and go to step F);

If there are m points $p_i$, then define the morphing function $\alpha_{p_i}(x)$, $\forall x \in \Omega$ for each point respectively:

$$\alpha_{p_i}(x) = \begin{cases} 1, & \|x - p_i\| \leq r_{p_i}^0 \\ \Gamma_{p_i}(x), & r_{p_i}^0 < \|x - p_i\| \leq r_{p_i}^1 \\ 0, & \|x - p_i\| > r_{p_i}^1 \end{cases}$$

where $\Gamma_{p_i}(x)$ is a function whose value range is [0,1], $r_p^0$ and $r_p^1$ are two non-negative numbers, and $r_p^0 \leq r_p^1$;

E) Update $\alpha(x)$, $\forall x \in \Omega$;

Put m points $p_i$ into $\Omega_\theta$. If $\Omega_\theta$ contains n points $p_i$ (where i=1, 2, 3, . . . , n, and n≥m), then the value of $\alpha(x)$ is the maximum value of n functions, $\alpha_{p_i}(x)$, i.e.:

$\alpha(x) = \max\{\alpha_{p_i}(x) | \forall p_i \in \Omega_\theta, i=1,2,\ldots,n\}$, $\forall x \in \Omega$ F) Loop B)-E) until $l_\xi$=0 and m=0;

G) Increase the external load successively and loop B)-F) after each increase of the external load value, until the external load exceeds the maximum external load;

H) End the calculation and output the results by the strength-criterion-driven peridynamic model, i.e., the structure's damage prediction. According to these results, it is possible to understand relevant information, such as the load change trend, the peak load, the crack initiation position, the crack propagation path, the fracture mode, and the structural fracture degree during the life period. Based on this knowledge, designers can optimize the real structure's design, which helps to build more reliable and stable industrial equipment, buildings, and other structures. The calculation results include strain field contour, stress field contour, and bond-breaking equivalent damage contour, animation from crack initiation and propagation on the structure until complete failure of the structure, the stress-displacement curve of the entire life period. In the bond-breaking equivalent damage contour, the calculation formula for the bond-breaking equivalent damage $d_\xi(x,t)$ at point x at calculation step t is:

$$d_\xi(x, t) = \frac{\int_{H_\delta(x)} (1 - \mu(t, \xi)) \omega_{crit} dV_p}{\int_{H_\delta(x)} \omega_{crit} dV_p},$$

where $\omega_{crit}$ denotes the critical fracture energy of peridynamic bond, and its calculation formula is:

$$\omega_{crit} = \frac{1}{2} c^0(\xi) s_{crit}^2 \|\xi\|^4.$$

(2) Input the geometric and material parameters and working conditions of the predicted structure into the strength-criterion-driven peridynamic model, then the failure life period of the predicted structure can be obtained.

Based on the coupling model of continuum mechanics and peridynamics, this invention proposes introducing peridynamics automatically for simulating structural failure through strength criterion determination. Compared with the classical continuum mechanics simulation, this invention can simulate the process of crack initiation and fracture. Compared with the simulation that uses peridynamic on the entire structure, the method proposed in this invention only uses peridynamic in the local zone near the crack. Most other zones on the structure still adopt more economic classical continuum mechanics simulation, which dramatically reduces the amount of calculation and saves calculation time. Compared with the known technology mentioned above, there is no need to pre-set the peridynamic domain by experience in this invention. The peridynamic model is introduced adaptively to make the prediction more accurate. Moreover, this invention does not consider the material's degradation process and is more suitable for predicting the typical structural failure process, such as a brittle fracture. This invention further demonstrates the accuracy of the results predicted by this invention and the effectiveness and applicability of this invention for complex structure through the following two examples.

(1) Uniaxial tension test of dog-bone-shaped structure.

Figure 2A:
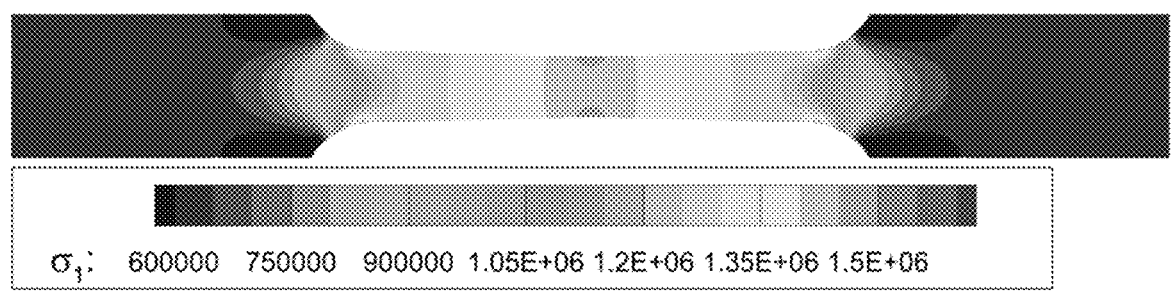
FIG. 2A shows the stress field and the failure results of the structure calculated based on the maximum tensile stress criterion: Contour of the maximum principal stress field at the 80th calculation step.
Figure 2B:
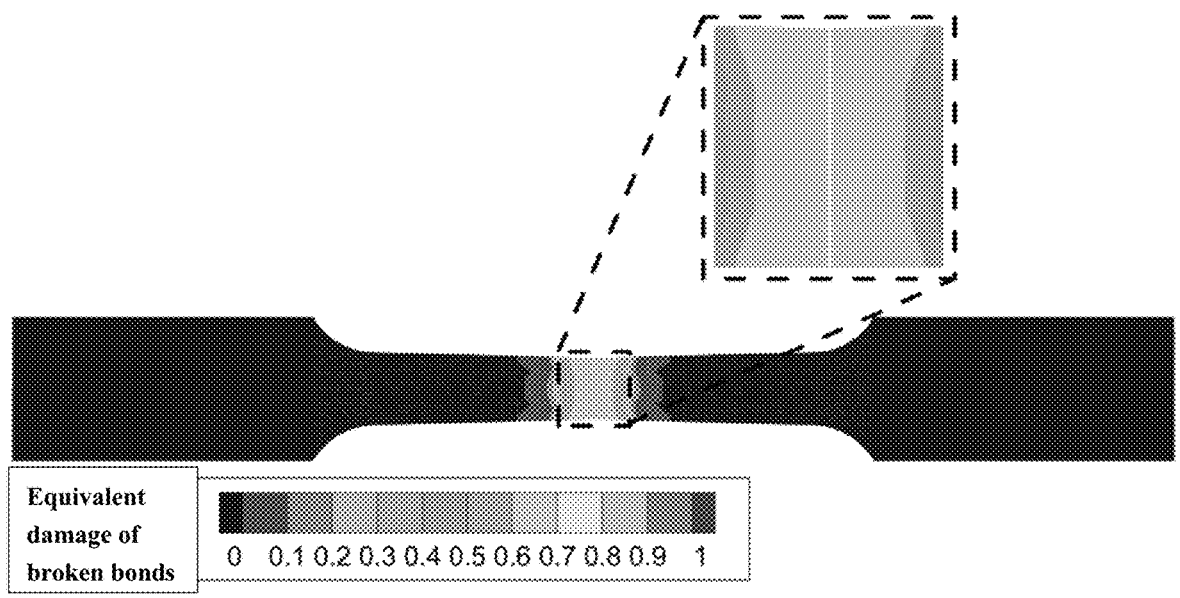
FIG. 2B shows the stress field and the failure results of the structure calculated based on the maximum tensile stress criterion: Contour of the equivalent damage of the broken bonds at the 81st calculation step, and the middle of the structure is completely broken.
Figure 3:
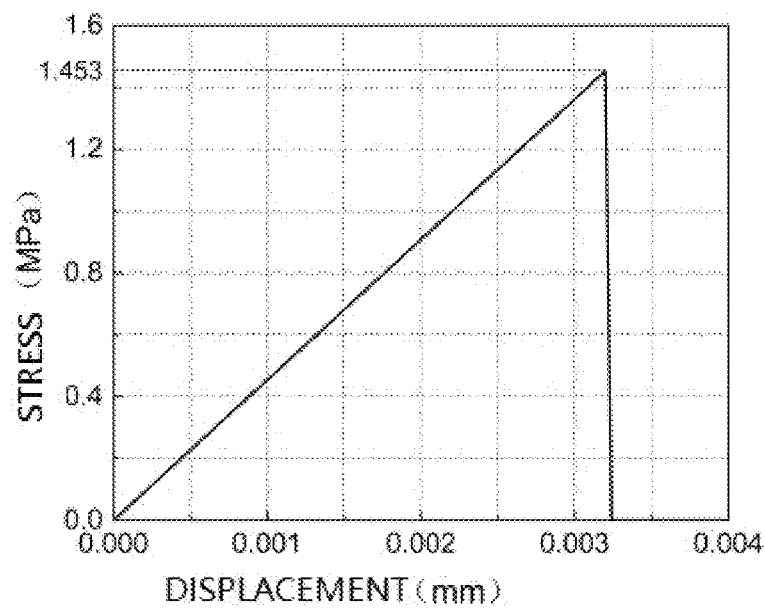
FIG. 3 shows the stress-displacement curve of the dog-bone-shaped structure predicted based on the maximum tensile stress criterion.

This example considers a dog-bone-shaped structure whose geometric dimensions and external load conditions are shown in FIG. 1. The Young's modulus and Poisson's ratio of the material are set to E=30 GPa and $\upsilon$=⅓ respectively, and the strength of the material is preset to $\theta_{crit}$=1.5 MPa. FIGS. 2A-B show the calculation results of structural failure based on the maximum tensile stress criterion. FIG. 2A is the contour of the maximum principal stress field before the structure breaks at the 80th calculation step, and FIG. 2B is the contour of equivalent damage of the broken bond of the structure at the 81st calculation step, showing the crack morphology of the structure when it is destroyed. FIG. 3 shows the stress-displacement curve of the structure predicted based on the maximum tensile stress criterion. It can be seen from the figure that the maximum stress value of the structure predicted by this invention is 1.453 MPa. According to theoretical analysis, the predicted maximum stress value should be consistent with the material's strength value. Because the preset material strength value is 1.5 MPa, it can be calculated that the relative error of the prediction result of this invention is 3.1%, which shows that this invention is of high prediction accuracy.

(2) The fracture of the randomly distributed porous plate.

Figure 4:
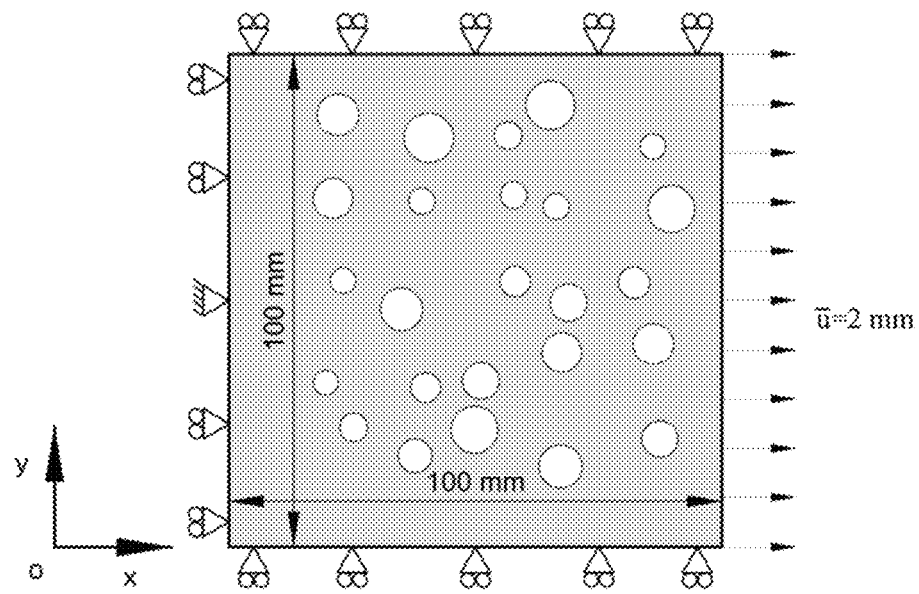
FIG. 4 shows the geometric dimensions and external load conditions of a randomly distributed porous plate.
Figure 5A:
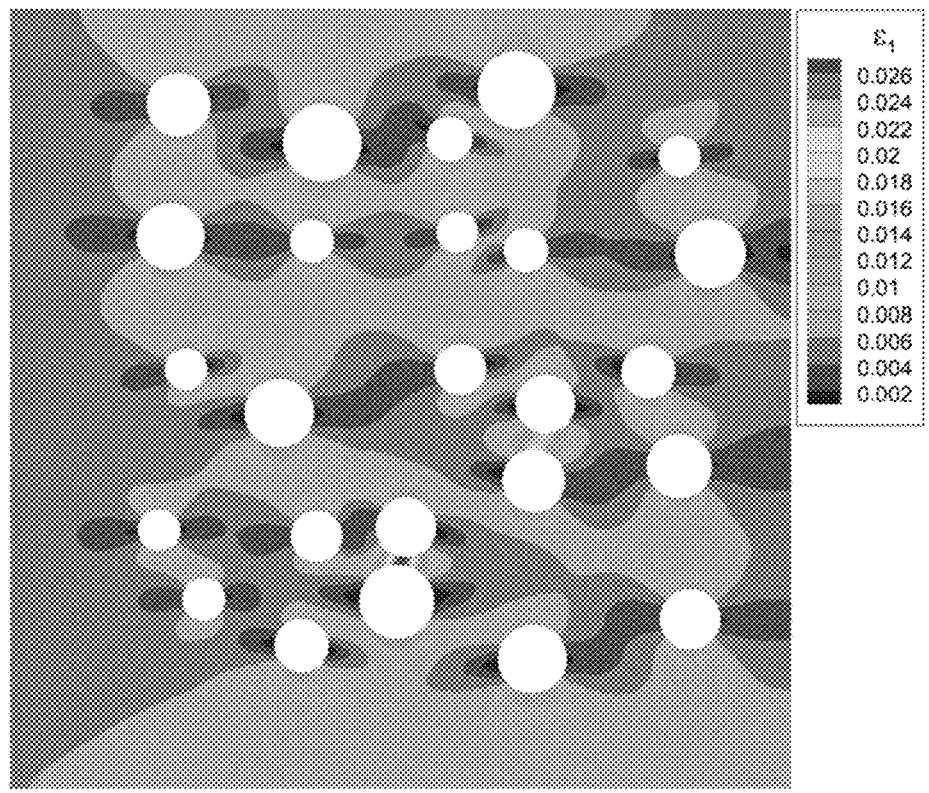
FIG. 5A shows the deformation and damage process of porous plate predicted based on the maximum tensile strain strength criterion: contour of the maximum principal strain field at the 34th calculation step.
Figure 5B:
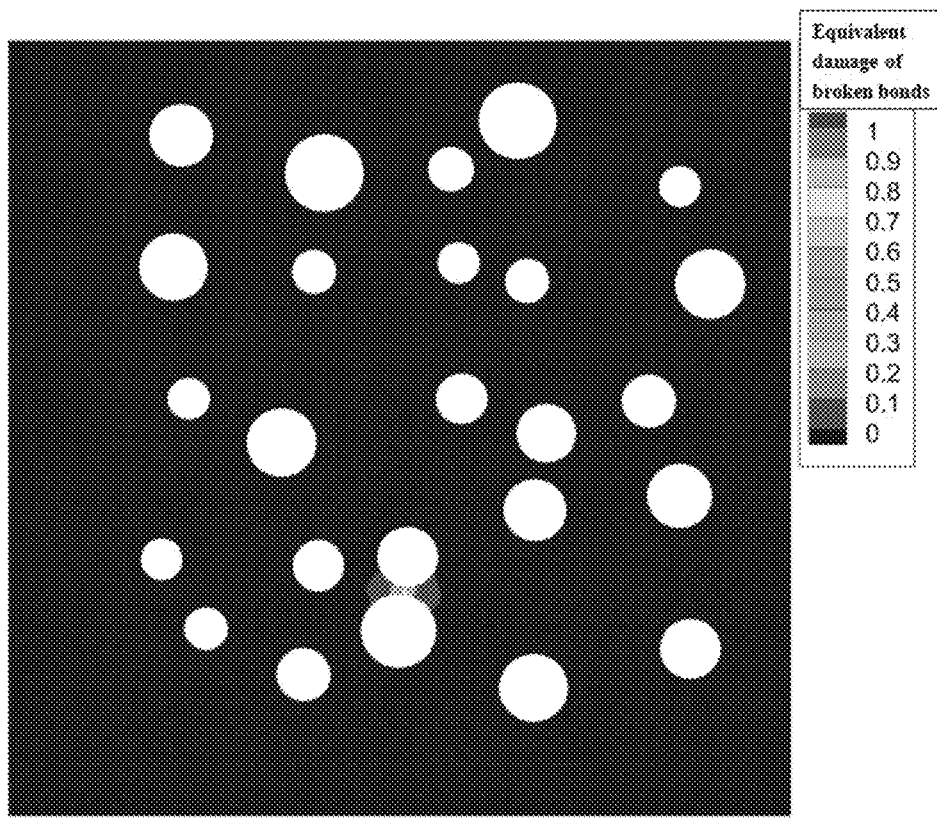
FIG. 5B shows the deformation and damage process of porous plate predicted based on the maximum tensile strain strength criterion: contour of equivalent damage of the broken bonds at the 35th calculation step, and cracks initiate in the local zone.
Figure 5C:
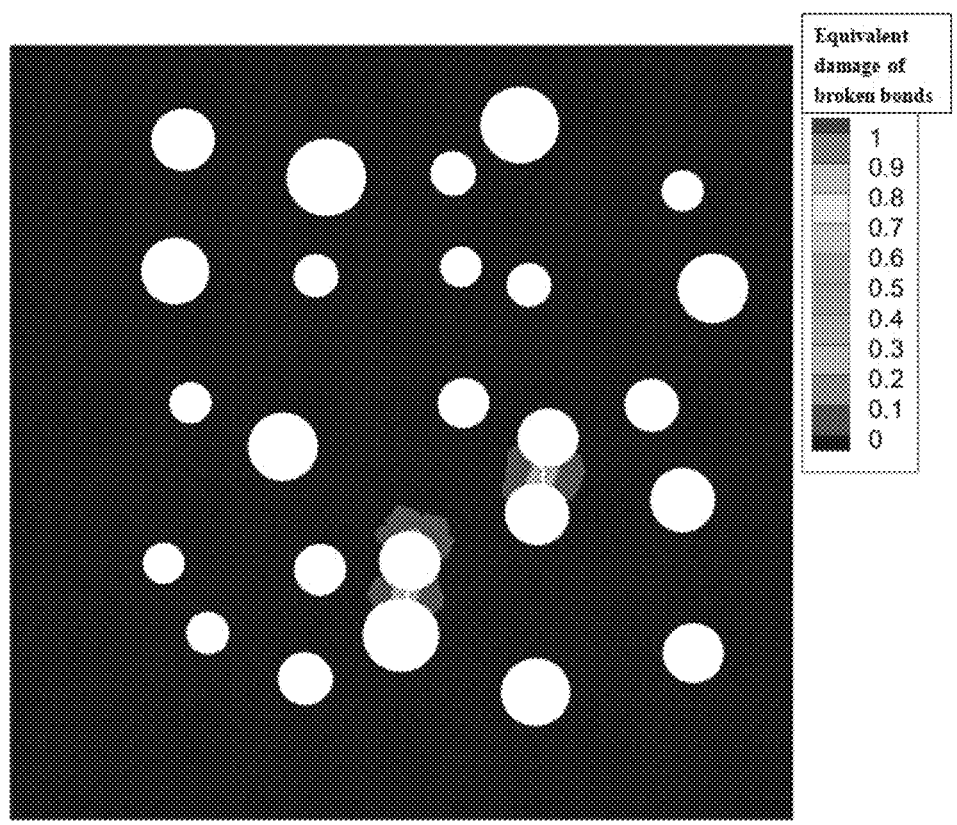
FIG. 5C shows the deformation and damage process of porous plate predicted based on the maximum tensile strain strength criterion: contour of the equivalent damage of the broken bonds at the 51st calculation step, and many cracks initiate and propagate.
Figure 5D:
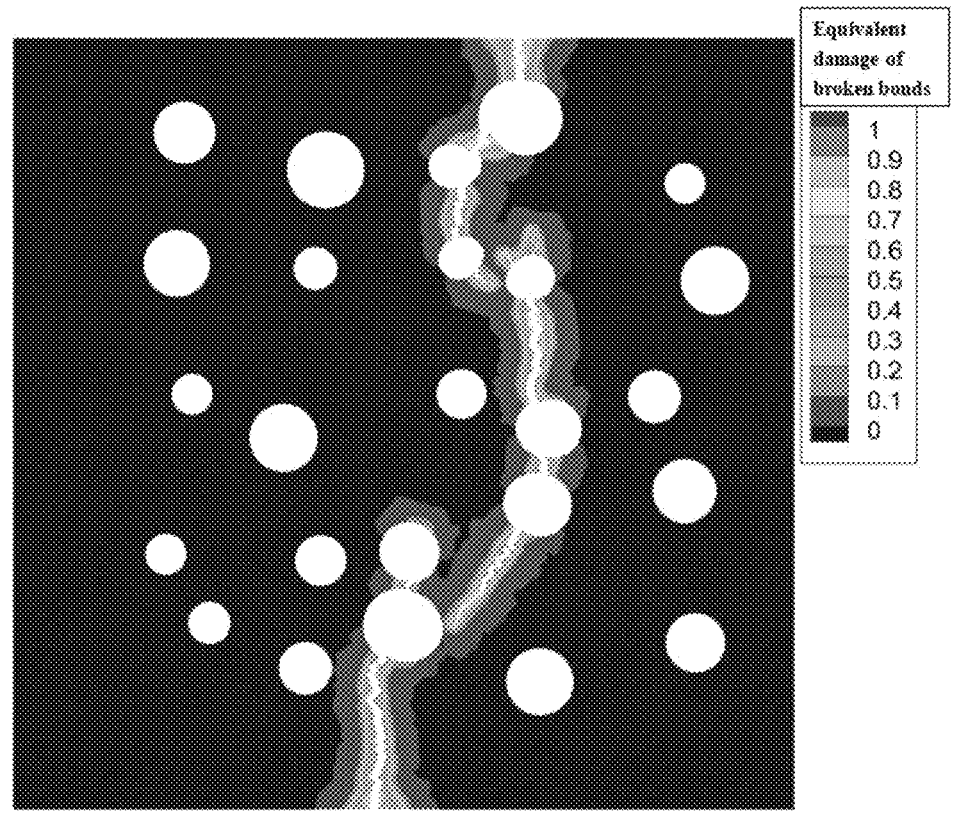
FIG. 5D shows the deformation and damage process of porous plate predicted based on the maximum tensile strain strength criterion: contour of the equivalent damage of the broken bonds at the 54th calculation step, and cracks are about to penetrate the entire structure.

This example simulates the failure process of a randomly distributed porous plate under the uniaxial tension load. FIG. 4 shows the geometric dimensions and external load conditions of the porous plate. The Young's modulus and Poisson's ratio of the material are set to E=30 GPa and $\upsilon=\frac{1}{3}$ respectively, and the strength of the material is preset to $\theta_{crit}=0.9$ MPa. FIGS. 5A-D show the porous plate's failure process based on the maximum tensile strain strength criterion in this invention, where FIG. 5A shows the contour of the maximum principal strain field on the porous plate at the 34th calculation step. It can be seen from the figure that the maximum principal strain increases significantly at local zones; FIG. 5B is the contour of equivalent damage of the broken bond of the porous plate at the 35th calculation step. It can be seen from the figure that the crack appears at the position where the maximum principal strain is significantly increased in FIG. 5A; FIG. 5C is the contour of equivalent damage of the broken bond of the porous plate at the 51st calculation step. The figure shows that the cracks appear at two different positions; FIG. 5D is the contour of equivalent damage of the porous plate's broken bond at the 54th calculation step. It can be seen that the crack is about to penetrate the entire porous plate.

The two calculation examples above use the maximum tensile stress strength criterion and the maximum tensile strain strength criterion to simulate the life period of two structures from deformation to crack initiation and propagation and to complete failure, demonstrating the accuracy, effectiveness, and practicality of this invention. According to the current research results of strength theory, many strength criteria have a wide range of applications. For different types of materials and structures, technicians can find suitable strength criterion and use this invention to study the entire life period of structures from deformation to crack initiation and propagation, and then to failure. Therefore, this invention will have a broad application prospect.

What is claimed is:

1. A method for predicting structural failure by a strength-criterion-driven peridynamic model, comprising building the strength-criterion-driven peridynamic model and applying geometric and material parameters and working conditions of a predicted structure in the strength-criterion-driven peridynamic model to obtain a life period from a deformation to a complete break of the predicted structure;

a specific process of the method for predicting the structural failure by the strength-criterion-driven peridynamic model is as follows:

(1) building the strength-criterion-driven peridynamic model for a structure;

summarizing a strength criterion of structural materials as:

$$\theta(\sigma(x)) \geq \theta_{crit} \text{ and } x \in \Omega,$$

where $\Omega$ denotes a set of points in the structure, $\theta(\sigma(x))$ denotes a strength function of a stress tensor $\sigma(x)$ at a point x of a stress field, $\theta_{crit}$ is a strength of a structural material;

defining $\Omega_\theta$ as the set of the points meeting the strength criterion for a first time during an entire calculation process;

according to the strength criterion of the structural material, coupling equations of continuum mechanics and peridynamics, and a bond-breaking criterion of a peridynamic bond $\xi$:

A) at an initial calculation step t=0, setting a weighting function $\sigma(x)$=0 and a switching function $\mu(t,\xi)$=1 in the coupling equations; and setting an initial and maximum external load;

B) solving the coupling equations to obtain a displacement field, a strain field, and a stress field of the structure;

C) calculating a stretch s and $\mu(t,\xi)$ of the peridynamic bond $\xi$ according to the bond-breaking criterion and the displacement field;

if a considered bond satisfies $\mu(t,\xi)$=0 for the first time, then to record a number $l_\xi$ of such bonds;

if not, then $l_\xi$=0;

D) a determination of the strength criterion and a definition of a morphing function:

according to the strength criterion of the structural material, determine whether there are m points $p_i$ (where i=1, 2, 3, . . . , m) in $\Omega$ meeting the strength criterion for the first time;

if not, then m=0 and go to step F);

if there are m points $p_i$, then define the morphing function $\sigma_{p_i}(x)$, $\forall x \in \Omega$ for each point respectively:

$$\alpha_{p_i}(x) = \begin{cases} 1, & \|x - p_i\| \leq r_{p_i}^0 \\ \Gamma_{p_i}(x), & r_{p_i}^0 < \|x - p_i\| \leq r_{p_i}^1 \\ 0, & \|x - p_i\| > r_{p_i}^1 \end{cases};$$

wherein $\Gamma_{p_i}(x)$ is a function, wherein a value range of the function is [0,1], $r_p^0$ and $r_p^1$ are two non-negative numbers, and $r_p^0 \leq r_p^1$;

E) updating $\alpha(x)$, $\forall x \in \Omega$;

putting m points $p_i$ into $\Omega_\theta$;

if $\Omega_\theta$ contains n points $p_i$ (where i=1, 2, 3 . . . , n, and n≥m), then a value of $\alpha(x)$ is a maximum value of n functions, $\alpha_{p_i}(x)$, as follows:

$$\alpha(x) = \max\{\alpha_{p_i}(x) | \forall p_i \in \Omega_\theta, i=1,2,\ldots,n\}, \forall x \forall n$$

F) looping steps B)-E) until $l_\xi$=0 and m=0;

G) increasing an external load successively and looping steps B)-F) after each increase of an external load value, until the external load exceeds the maximum external load;

H) ending a calculation and outputting results by the strength-criterion-driven peridynamic model, wherein a damage prediction of the structure is the results;

(2) inputting the geometric and material parameters and the working conditions of the predicted structure into the strength-criterion-driven peridynamic model to obtain a failure life period of the predicted structure and based on the results of the failure life period of the predicted structure, design and build equipment or buildings.

2. The method for predicting the structural failure by the strength-criterion-driven peridynamic model according to claim 1, comprising defining the strength function $\theta(\sigma(x))$ as $\theta(\sigma(x))=\sigma_1$ according to a theory of maximum tensile stress;

or, defining the strength function as $\theta(\sigma(x))=\sigma_1-\upsilon(\sigma_2+\sigma_3)$ according to a theory of a maximum tensile strain, where $\upsilon$ is a Poisson's ratio;

or, defining the strength function as $\theta(\sigma(x))=\sigma_1-\sigma_3$ according to a theory of a maximum shear stress;
or, defining the strength function as $$\theta(\sigma(x))=\sqrt{\frac{1}{2}[(\sigma_1-\sigma_2)^2+(\sigma_2-\sigma_3)^2+(\sigma_3-\sigma_1)^2]}$$

according to a theory of a maximum distortion energy;
where $\sigma_1$, $\sigma_2$ and $\sigma_3$ are determined as follows:
at least three planes orthogonal to each other are found at the point x, in the at least three planes, shear stress components of stresses tensor $\sigma(x)$ are zero, and normal stresses components reach an extremum, the at least three planes are called principal planes, and normal stresses on the at least three planes are called a principal stress, noted as $\sigma_1$, $\sigma_2$ and $\sigma_3$, and $\sigma_1$ is a maximum principal stress and $\sigma_3$ is a minimum principal stress.

3. The method for predicting the structural failure by the strength-criterion-driven peridynamic model according to claim 1, comprising establishing following coupling equations of the continuum mechanics and the peridynamics according to geometric dimensions, the material parameters, and external load conditions of the structure:
a kinematic admissibility and compatibility:

$$\varepsilon(x)=\frac{1}{2}(\nabla u(x)+\nabla u(x)^T),\ \forall x\in\Omega,$$

$\forall x\in\Omega$, $\eta(p,x)=u(p)-u(x),\ \forall x,p\in\Omega,$ $u(x)=\bar{u}(x),\ \forall x\in\Gamma_u,$ a static admissibility:

$$div\sigma(x)+\int_{H_\delta(x)}\{\hat{f}[x]\langle p-x\rangle-\hat{f}[p]\langle x-p\rangle\}dV_p+b(x)=0,\ \forall x\in\Omega,$$

$\forall x\in\Omega$, $\sigma(x)\cdot n(x)=\bar{T},\ \forall x\in\Gamma_T,$ a constitutive equations:

$\sigma(x)=E(x){:}\varepsilon(x),\ \forall x\in\Omega,$ $$\hat{f}[x]\langle p-x\rangle=\frac{1}{2}C[x](\xi)\cdot\eta(p,x),\ \forall x,p\in\Omega,$$

$\forall x,p\in\Omega$,
a constraint equations:

$C[x](\xi)=\alpha(x)c^0(\xi)\mu(t,\xi)\xi\otimes\xi,$ $$E(x)=E^0-\frac{1}{2}\int_{H_\delta(x)}c^0(\xi)\frac{\alpha(x)+\alpha(p)}{2}\xi\otimes\xi\otimes\xi\otimes\xi dV_p,$$

$$E^0=\frac{1}{2}\int_{H_\delta(x)}c^0(\xi)\xi\otimes\xi\otimes\xi\otimes\xi dV_p,$$

wherein x and p denote points in the set $\Omega$ of the points in the structure, $u(\bullet)$ is the displacement field, $\nabla u(x)$ denotes a gradient of $u(x)$, $\nabla u(x)^T$ denotes a transpose of the gradient of $u(x)$, $\varepsilon(x)$ is a strain tensor of the strain field at the point x, $\eta(p,x)$ denotes a difference between displacements of two points, and $\bar{u}(x)$ is a value of a displacement condition $\bar{u}$ applied at the point x on a boundary $\delta_u$, $\sigma(x)$ is the stress tensor of the stress field at the point x, $div\sigma(x)$ is a divergence of the stress tensor at the point x, $\hat{f}[\bullet]\langle\cdot-\cdot\rangle$ is a bond force density, $H_\delta(x)$ is a circular zone with a radius $\delta$ and centers on the point x, $\int_{H_\delta(x)}\cdot dV_p$ denotes an integral over the $H_\delta(x)$, $b(x)$ is an external body force vector of an external body force field at the point x, and $n(x)$ is an outer normal direction vector at the point x, $\bar{T}$ is a force boundary condition applied on the boundary $F_T$, $\varepsilon(x)$ is a stiffness tensor at the point x, f is the peridynamic bond and $\xi=p-x$, and $C[x](\xi)$ is a micro-modulus tensor at the point x associated with the peridynamic bond $\xi$, $c^0(\xi)$ is a micro-modulus coefficient of the peridynamic bond $\xi$, $\mu(t,\xi)$ is a function associated with a calculation step t and the peridynamic bond $\xi$ and takes values on either 0 or 1, $E^0$ is the stiffness tensor, $\alpha(\bullet)$ is the weighting function of the point x, a definition of an operator ":" denotes a double dot product operation of the stiffness tensor, "·" denotes a single dot product operation of the stiffness tensor and $\otimes$ denotes a dyadic operation of a vector.

4. The method for predicting the structural failure by the strength-criterion-driven peridynamic model according to claim 1, wherein the bond-breaking criterion of peridynamics is defined as:

$$\mu(t,\xi)=\begin{cases}1,&\text{if }s(t',\xi)<s_{crit},\text{ for all }0\le t'\le t,\\0,&\text{otherwise,}\end{cases}$$

if $s(t',\xi)<s_{crit}$, for all $0\le t'\le t$,
otherwise, $$s=\frac{\|\xi+\eta\|-\|\xi\|}{\|\xi\|}\xi,$$

wherein $\|\bullet\|$ is a length of a calculated vector, s is the stretch of the peridynamic bond $\xi$,
$\eta$ denotes a difference between displacements of two points, $s_{crit}$ is a critical stretch of the peridynamic bond, t denotes a current calculation step, t' is an arbitrary calculation step before a calculation step t, and $s(t',\xi)$ is a stretch of bond $\xi$ at calculation step t', $\mu(t,\xi)=0$ means the peridynamic bond $\xi$ is broken.

5. The method for predicting the structural failure by the strength criterion-driven peridynamic model according to claim 1, wherein a specific manifestation of calculation results comprising: a strain field contour, a stress field contour, and a bond-breaking equivalent damage contour, an animation from crack initiation and a propagation on the structure until a complete failure of the structure, a stress-displacement curve of an entire life period, in the bond-breaking equivalent damage contour, a calculation formula for a bond-breaking equivalent damage $d_\xi(x,t)$ at the point x at a calculation step t is as follows:

$$d_\xi(x, t) = \frac{\int_{H_\delta(x)} (1 - \mu(t, \xi))\omega_{crit} dV_p}{\int_{H_\delta(x)} \omega_{crit} dV_p},$$

wherein $\omega_{crit}$ denotes a critical fracture energy of the peridynamic bond, and a calculation formula of the $\omega_{crit}$ is as follows: $\omega_{crit} = \frac{1}{2} c^0(\xi) s_{crit}^2 \|\xi\|^4$; where $c^0(\xi)$ is a micro-modulus coefficient of bond $\xi$, $s_{crit}$ is a critical stretch of the peridynamic bond, and $H_\delta(x)$ is a circular zone with a radius $\delta$ and centers on x.

* * * * *

UNITED STATES PATENT AND TRADEMARK OFFICE
CERTIFICATE OF CORRECTION

PATENT NO. : 11,321,503 B2
APPLICATION NO. : 17/431433
DATED : May 3, 2022
INVENTOR(S) : Han et al.

It is certified that error appears in the above-identified patent and that said Letters Patent is hereby corrected as shown below:

On the Title Page

Item (72), 2nd and 3rd Inventor should be corrected to read:
--Yongwei Wang Haikou, CN
Gilles Lubineau Thuwal, SA--

Signed and Sealed this
Twenty-third Day of May, 2023

Katherine Kelly Vidal
*Director of the United States Patent and Trademark Office*